United States Patent [19]

Uwano

[11] Patent Number: 4,984,125

[45] Date of Patent: Jan. 8, 1991

[54] ARRESTER APPARATUS

[75] Inventor: Yukio Uwano, Sagamihara, Japan

[73] Assignee: Sankosha Corporation, Tokyo, Japan

[21] Appl. No.: 391,293

[22] Filed: Aug. 9, 1989

[30] Foreign Application Priority Data

Aug. 10, 1988 [JP] Japan .......................... 63-104861[U]

[51] Int. Cl.[5] .......................... H02H 1/04

[52] U.S. Cl. .......................... 361/124; 361/120; 361/118; 237/34

[58] Field of Search .......................... 361/117, 118, 120, 123; 237/32, 34

[56] References Cited

U.S. PATENT DOCUMENTS

| | | | |
|---|---|---|---|
| 3,813,577 | 5/1974 | Kawiecke | 317/16 |
| 4,034,326 | 7/1977 | Hill et al. | 337/34 |
| 4,056,840 | 11/1977 | Lundsgaard et al. | 361/124 |
| 4,150,414 | 4/1979 | Pagliuca | 361/124 |
| 4,371,911 | 2/1983 | Baker | 361/124 |
| 4,424,546 | 1/1984 | Smith | 361/119 |
| 4,717,902 | 1/1988 | James | 337/32 |
| 4,851,946 | 7/1989 | Igaraski et al. | 361/117 X |
| 4,851,957 | 7/1989 | Chang | 361/124 |

FOREIGN PATENT DOCUMENTS

| | | |
|---|---|---|
| 0027061 | 4/1981 | European Pat. Off. . |
| 0308553 | 3/1989 | European Pat. Off. . |
| 2018028A | 3/1979 | United Kingdom . |
| 2078025A | 5/1981 | United Kingdom . |
| 2146490A | 4/1985 | United Kingdom . |
| 2153609A | 8/1985 | United Kingdom . |
| 2170352A | 7/1986 | United Kingdom . |
| 2172453A | 9/1986 | United Kingdom . |
| 2205992 | 12/1988 | United Kingdom . |

*Primary Examiner*—Derek S. Jennings
*Attorney, Agent, or Firm*—Foley & Lardner, Schwartz, Jeffery, Schwaab, Mack, Blumenthal & Evans

[57] ABSTRACT

In a gas-filled arrester, a pair of main electrodes and a ground electrode are air-tightly fitted to an insulating tubular member. A springy, electrically-conductive short-circuiting element having an arcuate shape is fitted around the outer wall of the ground electrode. The short-circuiting element includes extension portions extending along the outer wall of the insulating tubular member to the respective main electrodes, and these extension portions are made to face the main electrodes by utilization of spring characteristics thereof with a certain gap maintained and with a thermally-fusible spacer interposed. With this construction, if the arrester is overheated, the spacer is thermally fused by heat and therefore the extension portions electrically contact the main electrodes due to the spring characteristics thereof. Since the main electrodes are thus short-circuited to the ground electrode, the arrester is prevented from failing.

3 Claims, 6 Drawing Sheets

ARRESTER APPARATUS

BACKGROUND OF THE INVENTION

1. Field of the Invention

The present invention relates to an arrester, such as a gas-filled discharge tube, for protecting an electric device from high-voltage surge which may be caused by lightning or the like. More particularly, the invention relates to the arrester's fail-safe mechanism which prevents the arrester from failing even if the arrester continues discharging for a long time and is therefore overheated as a result of long-time application of high-voltage surge.

2. Description of the Related Art

In general, an arrester is not overheated if its electric discharge occurs for a comparatively short time. However, if the discharge continues for a long time, the arrester may be overheated and fail. To prevent such an overheated condition, a conventionally-known arrester comprises a short-circuiting mechanism which short-circuits the discharge electrodes of the arrester in response to the overheated condition of the arrester, as is shown in FIGS. 1A and 1B. FIG. 1A is a partially-sectional view of the conventional arrester, and FIG. 1B is a plan view of the same.

Referring to FIGS. 1A and 1B, reference numeral 30 denotes a gas-filled arrester; 31, the main body of the arrester; 32, a ground electrode; 32', a terminal of the ground electrode; 33 and 33', line electrodes; 34 and 34', terminals of the line electrodes; 35, a metallic short-circuiting member; 36, a horizontal portion of the metallic short-circuiting member; 37, an engaging piece provided for the metallic short-circuiting member in a manner to engage with ground electrode 32; and 38 and 38', springy contact pieces which extend from the ends of horizontal portion 36 of metallic short-circuiting member 35 in such a manner that they can engage with line electrodes 33 and 33', with thermally-fusible, electrically-insulating spacers 39 and 39' interposed.

If arrester 31 shown in FIGS. 1A and 1B is overheated, insulating spacers 39 and 39' are thermally fused by heat. As a result, contact pieces 38 and 38' are pressed against line electrodes 33 and 33', due to their spring characteristics, thus short-circuiting line electrodes 33 and 33' to ground electrode 32. In this fashion, the occurrence of an accident arising from the overheated condition of the arrester is prevented.

The conventional arrester, such as that described above, is undesirably long. In addition, the metallic short-circuiting member of the arrester has a complicated construction. Therefore, the short-circuiting member cannot be fabricated without a waste of material, and the metallic mold for fabricating the short-circuiting member is costly.

Accordingly, an object of the present invention is to provide an arrester which is free from the above problems, is structurally simple and small-sized, and is easy to fabricate.

SUMMARY OF THE INVENTION

To achieve the above object, the present invention provides an arrester which comprises: a pair of main electrodes airtightly coupled to the respective open ends of an insulating tubular member; a ground electrode attached to the central portion of the insulating tubular member; and an arcuate short-circuiting element formed of a springy, electrically-conductive material and fitted around the outer wall of the ground electrode due to the spring characteristics thereof, the short-circuiting element including extension portions extending along the outer wall of the insulating tubular member to the respective main electrodes, the extension portions facing the main electrodes with a certain gap maintained and with a thermally-fusible spacer interposed, whereby, if the arrester is overheated, the spacer is thermally fused by heat and the extension portions therefore electrically contact the main electrodes due to the spring characteristics thereof, thus short-circuiting the main electrodes to the ground electrode.

In the arrester of the present invention, an arcuate, electrically-conductive short-circuiting element is fitted around the outer wall of the ground electrode by utilization of the spring characteristics thereof, and the short-circuiting element includes extension portions which face the paired main electrodes with a certain gap maintained and with a thermally-fusible spacer interposed. If the arrester is applied with overvoltage, such as a high voltage surge, it immediately starts discharging to absorb the overvoltage. If the arrester is overheated after continuing the discharging for a long time, the spacer is thermally fused by heat, so that each extension portion of the short-circuiting member is electrically connected to the corresponding main electrode. As a result, each main electrode is short-circuited to the ground electrode, thus preventing the arrester from being overheated further.

Moreover, the arrester of the present invention is short, in comparison with the conventional arrester wherein a short-circuiting member extends in the longitudinal direction of the arrester. In addition, the arrester of the present invention is structurally simple and small-sized and is easy to fabricate.

DESCRIPTION OF THE PREFERRED EMBODIMENTS

Figure 1B:
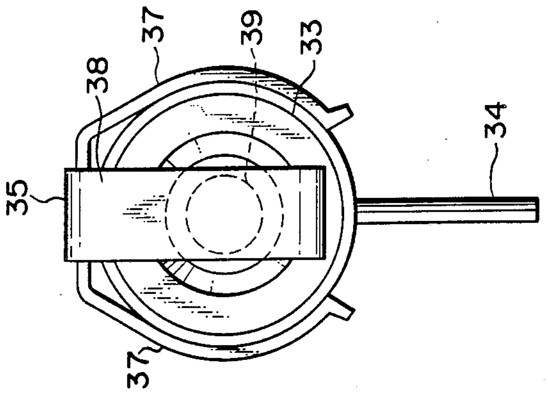
FIG. 1B (PRIOR ART)
FIG. 1B is a plan view of the conventional arrester.
Figure 1A:
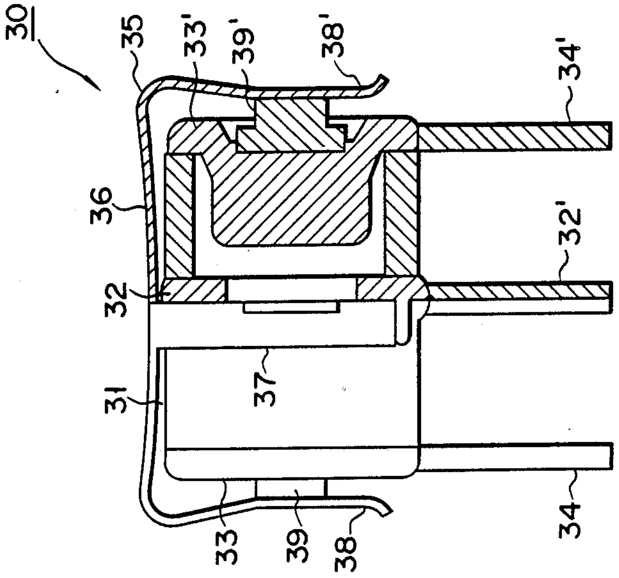
FIG. 1A (PRIOR ART)
FIG. 1A is a partially-sectional view of the conventional arrester.
Figure 2A:
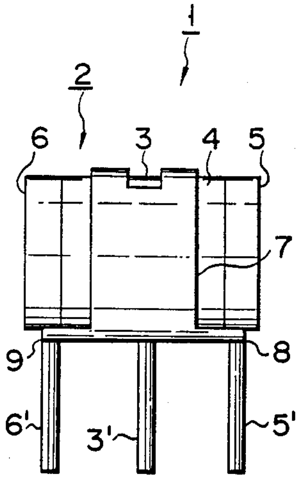
FIGS. 2A, 2B and 2C are front, bottom, and side views, respectively, of one embodiment of the present invention.
Figure 2B:
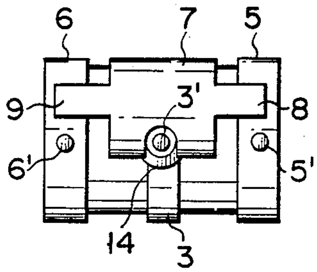
Figure 2C:
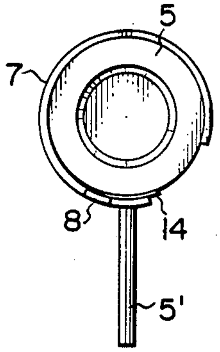
Figure 3A:
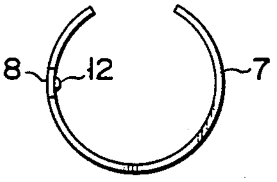
FIG. 3A is an enlarged side view illustrating the electrically-conductive short-circuiting element shown in FIG. 2A.
Figure 4A:
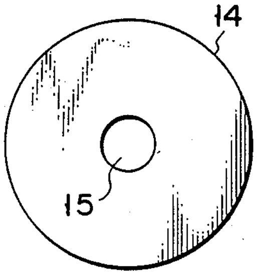
FIG. 4A is an enlarged plan view illustrating the spacers shown in FIG. 2B.
Figure 3B:
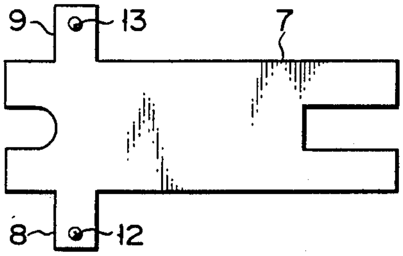
FIG. 3B illustrates the spread state of the short-circuiting element.
Figure 4B:
FIG. 4B is a sectional view of the spacers.

FIGS. 2A, 2B and 2C show arrester 1 according to one embodiment of the present invention. As is shown, arrester 1 comprises gas-filled main body 2 which is of a three-electrode type having an intermediate electrode in the center thereof. More specifically, main body 2 is made up of insulating tubular member 4; a pair of main electrodes 5 and 6 which are air-tightly coupled to the open ends of tubular member 4 in a manner to face each other, with a discharge gap defined therebetween; and a ground electrode 3 (i.e., the intermediate electrode) which is attached to the center of insulating tubular member 4 and which is made to face main electrodes 5 and 6, with a discharge gap defined therebetween. To electrically connect main body 2 to an external device, electrodes 3, 5 and 6 have terminals 3′, 5′ and 6′, respectively. Reference numeral 7 denotes a springy, electrically-conductive short-circuiting element. As is shown in FIGS. 3A and 3B, conductive short-circuiting element 7 has an arcuate shape and is designed such that it can be fitted around the outer wall of insulating tubular member 4 by utilization of the spring characteristic. Short-circuiting element 7 is electrically connected to ground electrode 3 when it is fitted around the outer wall of ground electrode 3. Short-circuiting member 7 includes extension portions 8 and 9 which extend along the outer wall of insulating tubular member 4 to main electrodes 5 and 6. These extension portions 8 and 9 have contacts 12 and 13, respectively. Reference numeral 14 denotes a spacer having such a shape as is shown in FIGS. 4A and 4B. It is formed of a thermally-fusible, electrically-insulating material, such as rubber, plastics, or alloy. Terminal 3′ of ground electrode 3 is fitted in central hole 15 of spacer 14, and in this condition spacer 14 is sandwiched between conductive short-circuiting element 7 and ground electrode 3. Contacts 12 and 13 are made to face main electrodes 5 and 6, respectively, with a certain gap maintained and with spacer 14 interposed therebetween. If main body 2 is overheated, spacer 14 is thermally fused by heat. Thus, contacts 12 and 13 are electrically connected to main electrodes 5 and 6 due to the spring characteristics thereof. In this fashion, main electrodes 5 and 6 are short-circuited to ground electrode 3.

The operation of the embodiment shown in FIGS. 2A to 2C will now be described.

If overvoltage is applied between the main electrodes and the ground electrode of arrester 1 inserted in a power distribution line, gas-filled main body 2 immediately starts discharging and guides the overvoltage to the ground, to thereby protect the electric devices connected to the power distribution line from the overvoltage.

If the discharge operation of main body 2 continues for a long time for some reason or other, resulting in overheat of main body 2, spacer 14 is thermally fused by heat. As a result, contacts 12 and 13 are electrically connected to main electrodes 5 and 6, due to the spring characteristics thereof, so that main electrodes 5 and 6 are short-circuited to ground electrode 3. In this fashion, main body 2 is prevented from being overheated further.

In the embodiment mentioned above, spacer 14 having such a shape as is shown in FIG. 3 is sandwiched between conductive short-circuiting element 7 and ground electrode 3, with terminal 3′ of ground electrode 3 inserted into central hole 15 of spacer 14. In this condition, contacts 12 and 13 are made to face main electrodes 5 and 6 with a certain gap maintained. In stead of employing this construction, thermally-fusible electrically-insulating spacers may be interposed between the contacts (12, 13) and the main electrodes (5, 6). Alternatively, a thermally-fusible, electrically-insulating material may be coated directly on contacts 12 and 13 such that the material is located between the contacts and the main electrodes.

According to the present invention, a springy, electrically-conductive short-circuiting element having an arcuate shape is fitted around the insulating tubular member of an arrester such that it is electrically connected to a ground electrode, and the extension portions of the conductive short-circuiting element are made to face the main electrodes with a certain gap maintained and with a thermally-fusible spacer interposed. With this construction, the arrester is short, in comparison with the conventional arrester wherein a short-circuiting piece extends in the longitudinal direction of the arrester. Therefore, the arrester is simple in construction and is small-sized. In addition, it is easy to fabricate.

What is claimed is:

1. An arrester, comprising:
- an insulating tubular member;
- a pair of main electrodes air-tightly coupled to respective open ends of said insulating tubular member;
- a ground electrode attached to a central portion of said insulating tubular member; and
- a springy, electrically-conductive short-circuiting element having a substantially cylindrical shape essentially conforming to the shape of said insulating tubular member, said short-circuiting element being fitted around an outer wall of said ground electrode by utilization of spring characteristics of said short-circuiting element to allow electrical connection between said short-circuiting element and said ground electrode, said short-circuiting element including extension portions extending along an outer wall of said insulating tubular member to respective main electrodes, said extension portions facing said main electrodes with a certain gap maintained when a thermally-fusible spacer is unfused;
- wherein if said arrester is overheated, said spacer is thermally fused by heat and said extension portions electrically contact said main electrodes due to spring characteristics, short-circuiting said main electrodes to said ground electrode;
- and wherein said spacer has a central hole and is sandwiched between said short-circuiting element and said ground electrode, with a terminal of said ground electrode fitted in said central hole, and said extension portions of said short-circuiting element are made to face said main electrodes by utilization of spring characteristics, with said certain gap maintained.

2. An arrester according to claim 1, wherein said spacer is a thermally-fusible, electrically-insulating spacer formed of rubber or plastics.

3. An arrester according to claim 1, wherein said spacer is formed from a thermally-fusible alloy.

* * * * *